United States Patent
Kuhmann et al.

(10) Patent No.: US 6,832,013 B1
(45) Date of Patent: Dec. 14, 2004

(54) HYBRID INTEGRATION OF ACTIVE AND PASSIVE OPTICAL COMPONENTS ON AN SI-BOARD

(75) Inventors: Jochen Friedrich Kuhmann, Copenhagen (DK); Mogens Rysholt Poulsen, Copenhagen (DK)

(73) Assignee: Hymite A/S, Kgs. Lyngby (DK)

( * ) Notice: Subject to any disclaimer, the term of this patent is extended or adjusted under 35 U.S.C. 154(b) by 379 days.

(21) Appl. No.: 10/030,639

(22) PCT Filed: Jul. 17, 2000

(86) PCT No.: PCT/DK00/00407

§ 371 (c)(1),
(2), (4) Date: Apr. 23, 2002

(87) PCT Pub. No.: WO01/06285

PCT Pub. Date: Jan. 25, 2001

(30) Foreign Application Priority Data

Jul. 16, 1999 (DK) .......................... 1999 01040

(51) Int. Cl.$^7$ ................................. G02B 6/12
(52) U.S. Cl. ................... 385/14; 385/52; 385/159
(58) Field of Search ....................... 385/14, 31, 32, 385/37, 39, 50, 52, 129, 131

(56) References Cited

U.S. PATENT DOCUMENTS

| | | | |
|---|---|---|---|
| 4,356,047 A | | 10/1982 | Gordon et al. |
| 5,023,881 A | | 6/1991 | Ackerman et al. |
| 5,259,049 A | * | 11/1993 | Bona et al. ............... 385/50 |
| 5,259,059 A | * | 11/1993 | Abramov ................. 385/123 |
| 5,488,678 A | | 1/1996 | Taneya et al. |

(List continued on next page.)

FOREIGN PATENT DOCUMENTS

| | | |
|---|---|---|
| EP | 0864893 A2 | 9/1998 |
| EP | 0864893 A3 | 9/1998 |
| JP | 7-19873 | 8/1995 |

OTHER PUBLICATIONS

S.A. Meritt, et al., "A Rapid Flip Chip Die Bonding Method for Semiconductor Laser Diode Arrays", 1997, pp. 775–779.

J. Gates, et al., "Hybrid Integrated Silicon Optical Bench Planar Lightguide Circuits", 1998, total of 9 pages.

(List continued on next page.)

Primary Examiner—Daniel St. Cyr
(74) Attorney, Agent, or Firm—Fish & Richardson P.C.

(57) ABSTRACT

The present invention relates to an assembly structure and a method for assembling active and passive photonic and/or optoelectronic devices on a silicon board. The invention relates in particular to an assembly structure and a method for aligning the photonic devices during the assembling procedure. According to the present invention, the assembly structure comprises one or more alignment features comprising tapered side surface parts in directions at least substantially parallel to an optical axis. By providing a tapering in a direction in a direction at least substantially parallel to the first optical axis, any inaccuracies primarily affects the non-critical positioning in the direction along the optical axis, whereas the critical positioning transverse to the optical axis merely depends on the symmetry of alignment features. The errors from the inherent inaccuracy of the position and shape of alignment features are thereby minimized. Also, the devices to be aligned are preferably arranged on top of the alignment features which forms part of the basic structure on the silicon board. All alignment features can thereby be defined in a single mask step together with the structures with which the alignment is to be carried out, resulting in an improved accuracy of the assembly structure. The resulting components will be used especially for broadband telecommunication components.

8 Claims, 9 Drawing Sheets

U.S. PATENT DOCUMENTS

| | | |
|---|---|---|
| 5,611,014 A | 3/1997 | Basavanhally |
| 5,656,507 A | 8/1997 | Welbourn et al. |
| 5,703,973 A * | 12/1997 | Mettler et al. ................ 385/14 |
| 5,721,797 A | 2/1998 | Basavanhally et al. |
| 5,745,631 A | 4/1998 | Reinker |
| 5,849,204 A | 12/1998 | Matsumoto |
| 5,907,646 A | 5/1999 | Kitamura |

OTHER PUBLICATIONS

Hans L. Althaus, et al., Microsystems and Waferprocesses for Volume Production of Highly Reliable Fiber Optic Components for Telecom–and Datacom–Application, 197, pp. 7–15.

Masataka Ito, et al., Use of AuSn Solder Bumps in Three–dimensional Passive Aligned Packaging of LP/PD Arrays on Si Optical Benches, 1996, pp. 1–7.

* cited by examiner

Structuring of poly-silicon etch stop by wet-etching

RIE etching of the waveguide facet

Completion of RIE etch for facet and alignment tapers

HYBRID INTEGRATION OF ACTIVE AND PASSIVE OPTICAL COMPONENTS ON AN SI-BOARD

This invention relates to an assembly structure and a method for assembling active and passive photonic and/or optoelectronic devices on a silicon board. The invention relates in particular to an assembly structure and a method for aligning the photonic devices during the assembling procedure. The resulting components will be used especially for broadband telecommunication components.

The assembly of photonic components is a very difficult and costly process. State of the art technology positions an optical fibre relative to a photonic component by an active alignment procedure. This means that during the alignment procedure the components are manipulated by highly accurate stages (±0.1 μm). The incoming or outgoing light signal is monitored during micromanipulation until the optimum of transmitted light has been determined. Then the fibre is mechanically fixed employing different techniques. The last assembly step is to put the fibre-terminated component into a housing, which then can be hermetically sealed in order to protect the semiconductor component. The housing provides electrical as well as optical feed-throughs. The fabrication of feed-throughs for the optical fibre is a process, which is difficult to manufacture, too.

The assembly is of photonic components is, due to the very demanding manufacturing steps time consuming and makes up typically 80% of the device cost. Much could be won if one used planar light guiding circuits (PLCs) for broadband telecommunication systems not only as passive components. PLCs have a very attractive potential to increase functionality by directly mounting semiconductor components onto the PLC board. But most importantly this concept, which in the literature is referred to as hybridisation could also facilitate the assembly of components and the subsequent hermetic sealing components to a high degree.

A typical application of a hybridly integrated photonic component is shown in FIG. 1 where a pump laser device 2 is attached onto a PLC board 10, which also hosts a waveguide 4 leading the light from the laser to other parts of an planar lightwave circuit (PLC). The alignment and assembly of the semiconductor component is achieved by a simple "clip-on" procedure, which does not require active alignment and therefore will greatly decrease assembly costs.

An inherent advantage of the hybrid integration concept is that it allows the light from the pump laser to be coupled directly into the waveguide whereas with conventional technologies each component has to be connected to a fibre separately, put into a housing and be connected using optical fibre connectors. The state-of-the art concept leads to bulky and difficult-to-handle components whereas the hybridisation leads to highly integrated and compact modules.

In the efforts to fully exploit the potential of PLCs one question is key; how does one obtain a long-term mechanical stability between the photonic component and the waveguide structure on the PLC board, and how can the active alignment procedure be avoided? This question has created a technical challenge for the fiberoptics components industry. The necessary coupling tolerance is in the submicron region and the fixation needs a mechanical stability of less than +/−0.1 μm under all possible operation and storage conditions.

In the prior art there are several attempts to achieve fastening of photonic components such as lasers to a PLC board by passive alignment.

Methods using highly accurate Flip-Chip Bonding machines have been developed. These make use of optical detection of fiducials (alignment marks) on the substrate and photonic component. Registration and positioning are however time consuming and equipment is very expensive.

Self-aligned bonding which make use of micromachined V-grooves for fibre fixation and the surface tension forces of the molten solder material, has been proposed and taken up by research facilities around the world. The method has been proven to reach the required tolerances. Nevertheless, the needed accuracy, which is within 1 μm, requires extremely well controlled process tolerances on soldering and V-groove micromachining, which will be costly to develop.

One of the alignment concepts that make use of etched alignment structures and surface tension forces of the molten solder material, is presented in U.S. Pat. No. 5,656,507. Here the silicon substrate is prepared with a waveguide, two alignment stops, a V-shaped groove and a trench with an L-shaped metal pad in the bottom. The bottom of the laser holds a ridge and an L-shaped metal pad with a solder bump so as to fit the V-shaped groove and the L-shaped metal pad on the silicon substrate. The principle is that when the laser is placed on the silicon substrate with the ridge inserted in the groove and an edge abutted to the alignment stops, the two L-shaped metal pads are slightly displaced though connected by the solder bump. When the solder is melted, it will draw the laser into alignment with the waveguide through surface tension forces.

Many companies have shifted their focus to alignment concepts, which require highly accurate pick and place machines in conjunction with alignment fiducials on the assembled parts (see H. L. Althaus et. al., "*Microsystems and Waferprocesses for Volumeproduction of Highly Reliable Fibre Optic Components for Telecom and Datacom Applications*", 47$^{th}$ ECTC Conf., San Jose, Calif., 1997, pp. 7–15). These concepts are very application specific and require large investments that only pay off for large production volumes. Parallel to that, an increasing number of publications emerged proposing a concept which makes use of dry- or wet-etched alignment structures, e.g. D. A. Ackerman (U.S. Pat. No. 5,023,881), J. Gates et al. ("*Hybrid Integrated Silicon Optical Bench Planar Lightguide Circuits*", 48$^{th}$ ECTC Conf., Seattle, Wash., 1998, pp. 551–559) and S. A Merrit ("*A Rapid Flip-Chip Bonding Method for Semiconductor Laser Diode Arrays*", 48$^{th}$ ECTC Conf., Seattle, Wash., 1998, pp. 775–779).

U.S. Pat. No. 5,023,881 covers the use of pedestals which initially forms a gap in-between the laser and the substrate. The vertical alignment is achieved by placing the laser on top of two pedestals, and the precision relies on the thickness of numerous individual layers. The specific alignment step consists of a cold welding for lacking the laser during the subsequent soldering. The horizontal alignment is not addressed in this patent and needs to be realised presumably by micromanipulation ("in a predetermined way").

Another alignment concept, which makes use of etched alignment structures, is presented in U.S. Pat. No. 5,721, 797. The patent discloses a method for aligning a laser relative to a fibre or a waveguide. Here, only the method relating to the waveguide is of interest. Two trenches are etched into the silicon substrate to later host waveguide structure (1$^{st}$ trench) and laser-mounting site (2$^{nd}$ trench). Then the second trench is filled with solder material, the first trench with cladding material for the optical waveguide. The procedure ensures that the waveguide core is at the same height as the light emitting core of the laser waveguide (vertical alignment). At the same time as the waveguide core material three alignment stops are formed to which the loser component will abut during assembly in order to achieve the horizontal alignment. The fabrication step is finalised by putting the top cladding onto the core waveguide material.

When the laser is then mounted on top of the solder (deposited into the $2^{nd}$ trench) the component is slithered towards the three alignment structures to ensure horizontal alignment. It is important to note that it is the sides of the laser, which abut the alignment stops, and the thickness of the solder deposition, which defines the horizontal and vertical alignment respectively. Applying heat to the assembly, thereby melting the solder the laser is mechanically fixed onto the silicon substrate.

Often, hybrid integration apparatuses are not compatible with the diversity of photonic devices from different manufacturers. Most of the prior art implies certain dimensions and features of the devices in order to perform the hybrid integration (U.S. Pat. No. 5,721,797). If the design of the device is changed the assembly structure needs to be changed as well. The situation in a production advanced PLCs will be that that the dimensions of photonic devices change. It will be too expensive and time-consuming to make adjustments to the assembly structures.

It is a disadvantage of the existing alignment concepts (U.S. Pat. No. 5,721,797) that the accuracy of the horizontal alignment relies on the precision etching of the alignment structures and on precision cleaving of the laser components. The required precision of both technologies is in a critical range for manufacturing (<1 $\mu$m).

It is a disadvantage of the existing alignment concepts (U.S. Pat. No. 5,721,797) that during melting of the solder to fasten the laser onto the PLC board the surface tension forces of the molten solder can move the laser chip and thus destroy the horizontal and especially the vertical alignment.

It is a disadvantage of the existing alignment concepts (U.S. Pat. No. 5,023,881) that the horizontal alignment of the components requires registration of alignment marks and accurate and thus costly micromanipulation to achieve the horizontal alignment.

It is a still further disadvantage of the existing alignment concepts (U.S. Pat. No. 5,023,881 and U.S. Pat. No. 5,721,797) that the vertical alignment relies on the thickness of several individual material layers (e.g. solder deposits) which need to be accurately deposited in relation to the thickness of a reference layer, which is the waveguide core of the PLC.

It is an object of the present invention to provide an assembly structure and a method for self-aligned hybrid assembly in which alignment can be realised before fastening.

It is another object of the present invention to provide an assembly structure and a method for self-aligned hybrid assembly in which reworking in case of a malfunctioning photonic components is possible, since the malfunctioning component can be detached by heating the structure, and replaced by a new component.

It is still another object of the present invention to provide an assembly structure and a method for self-aligned hybrid assembly, which implies only a minimum of "add-on" features to the photonic device, and does not require certain dimensions of the photonic device.

It is still another object of the present invention to provide an assembly structure and a method for self-aligned hybrid assembly where no processing, such as etching of the often fragile photonic device is needed.

It is still another object of the present invention to provide an assembly structure and a method for self-aligned hybrid assembly where the horizontal alignment relies on a single mask step in a photolithographic process.

It is still another object of the present invention to provide an assembly structure and a method for self-aligned hybrid assembly where the vertical alignment relies on the positioning of aligned components on what are essentially different parts of the same surface.

It is still another object of the present invention to provide an assembly structure and a method for self-aligned hybrid assembly where no accurate cleaving is needed since no cleaved surfaces abut during alignment.

It is still another object of the present invention to provide an assembly structure and a method for self-aligned hybrid assembly of photonic components, which is compact and thereby easy to pack and stack.

It is still another object of the present invention to provide an assembly structure and a method for self-aligned hybrid assembly of an array of photonic devices on a substrate.

It is still another object of the present invention that a hermetic sealing of the semiconductor component can be integrated into the processing, using basically the same masks, materials and processing steps used to form the assembly structure.

The above-mentioned objects are complied with by providing in a first aspect of the present invention an assembly structure comprising:

a substrate holding a bottom cladding layer, said bottom cladding layer comprising a first and a second part, wherein each part comprises a top and a bottom surface separated by a distance d, an optical waveguide comprising a top and a bottom surface and a light input or output end, said optical waveguide defining a first optical axis, the bottom surface of said optical waveguide being positioned at a distance larger than or equal to d above the bottom surface of the bottom cladding layer, and one or more first alignment features being formed in the second part of the bottom cladding layer, said one or more first alignment features further comprising a first and a second tapered side surface part in directions at least substantially parallel to the first optical axis.

The top surface of the first alignment features is essentially in the same plane as the top surface of the first part of the bottom-cladding layer. In order to confine light within the optical waveguide an additional material is provided to embed the waveguide core.

The assembly may further comprise a set of electrical contact pads suitable for providing electric energy to an optoelectronic device such as a semiconductor laser, a light emitting diode (LED) or a photodiode.

Preferably, the bottom surface of the optical waveguide core is positioned on the top surface of the bottom cladding layer at a distance substantially equal to d, where d is measured from the bottom surface of the bottom cladding layer.

The assembly structure according to the first aspect of the present invention may further comprise an optoelectronic device comprising an active part and a light input or output port, said input or output port being optically aligned with the waveguide output or input end by having the optoelectronic device arranged on top of the first alignment features to thereby obtain vertical alignment.

By arranging the optoelectronic device on top of the alignment features, a vertical alignment is achieved between the active part of the device and the waveguide. However, the active part of the device may be positioned at a given height above the bottom surface of the device, whereby the light input or output port will be positioned at a given height over the bottom-cladding layer when the device is arranged on top of the alignment features. Depending on this given height, and upon the respective sizes of the input/output port and the waveguide end, the waveguide may be positioned at a distance d+x above the bottom surface of the bottom cladding layer, where x compares to the given height of the active part in the optoelectronic device. The distance x may be controlled by depositing one or more material layers between the bottom-cladding layer and the waveguide core.

In order to horizontally align the light receiving input end of the optical waveguide with the light output port of the optoelectronic device, the assembly structure may further comprise one or more second alignment features abutting the one or more of the first alignment features of the second part of the bottom cladding layer. Preferably, the second alignment features abut the first and second tapered side surface parts of the first alignment features whereby the horizontal alignment is performed in the direction transversely to the optical axis of the waveguide.

The tapered surface parts provide an improved horizontal alignment on several points. The abutting of the second alignment features to the tapered side surface parts wedges the optoelectronic device to the structure and thereby provides a steady fixation until the devices is properly secured. Moreover, the orientation of the tapered side surface parts improves the accuracy in the critical positioning parameters of the optoelectronic device in relation to the waveguide. In the horizontal alignment, the direction transversely to the optical axis of the waveguide is very critical in order for light to couple between the waveguide and the active region. However, the distance between waveguide and the active region along the optical axis is considerably less critical. By providing a tapering in a direction at least substantially parallel to the first optical axis, the inherent inaccuracy of the position and shape of the first and second alignment features primarily affects the less critical distance between the waveguide and the active region.

For example, the optoelectronic device may be a light source comprising a light output port, an active part and one or more second alignment features being adapted to abut one or more of the first alignment features of the second part of the bottom cladding layer so as to align the light receiving input end of the optical waveguide with the light output port of the light source.

Etching may be applied to fabricate the assembly structure. In order to control the etching process an etch stop layer may be provided at some stage during the fabrication process on top of the first alignment features. In an embodiment according to the invention the etch stop layer is maintained on top of the first alignment features thereby arranged below the optoelectronic device.

It is preferred that during the formation of the assembly structure, the positioning of the optical waveguide: and the first alignment features is defined using a single mask. The reason for this being that for every mask being involved in the fabrication process an uncertainty is introduced in the positioning of one mask relative to another mask.

The second alignment features may comprise solder stripes arranged on the bottom of the optoelectronic device so as to at least partly engage the side walls of the first alignment features. Preferably, at least two solder stripes are arranged on the bottom of the optoelectronic device. In order to provide electrical power to the optoelectronic device the optoelectronic device may be soldered to metallized contact pads formed on exposed parts of the substrate.

As long as the solder stripes are positioned symmetrically, any inaccuracy in their separation or size will change the gap between the optoelectronic device and the waveguide, but not result in transverse misalignment. This means that if there is a tolerance in the width of the symmetrically designed 2 solder stripes the horizontal alignment will be unaffected whereas the less critical distance between waveguide and optoelectronic device will be changed according to the taper angle.

Preferably, two of the first alignment features provides the first and second tapered side surface parts on outer side surfaces, and the alignment features may be separated by a distance, larger than the width of the active part of the optoelectronic device.

As already mentioned, the optoelectronic device may comprise a variety of light sources, such as a semiconductor laser or a diode.

In a second aspect, the present invention relates to a method of forming an assembly structure for assembling an optoelectronic device and an optical waveguide, said optical waveguide comprising a light input end for receiving light emitted from an output port of the optoelectronic device, said method comprising the steps of:

provinding a bottom cladding layer on top of a substrate, said bottom cladding layer comprising a first and a second part, wherein each part comprises a top and a bottom surface separated by a distance d, providing a core layer on top of at least part of the bottom cladding layer, forming the optical waveguide in the core layer, said optical waveguide thereby extending along a first optical axis in a plane and at a distance larger than or equal to d from the bottom surface of the first part of the bottom cladding layer, and forming one or more first alignment features in the second part of the bottom cladding layer so that at least one top surface of the first alignment features is in essentially the same plane as the top surface of the first part of the bottom cladding layer, the step of forming the one or more first alignment features comprises the step of forming a first and a second tapered side surface part in directions at least substantially parallel to the first optical axis.

The method according to the second aspect of the present invention may further comprise the step of:

aligning the output port of the optoelectronic device with the light input end of optical waveguide, said alignment comprising the step of arranging the optoelectronic device on top of the one or more alignment features so as to obtain vertical alignment.

The optical waveguide may extend on the top surface of the bottom-cladding layer at a distance substantially equal to d above the bottom surface of the bottom-cladding layer.

As mentioned in relation with the first aspect of the present invention the optoelectronic device may further comprise one or more second alignment features abutting the first and second tapered side surface parts of the first alignment features so as to horizontally align the light receiving input end of the optical waveguide with the light output port of the optoelectronic device. By providing the tapering in a direction at least substantially parallel to the first optical axis, the inherent inaccuracy of the position and shape of the first and second alignment features primarily affects the less critical distance between waveguide and the active region. Again, it is preferred that the positioning of the optical waveguide and the first alignment features, are defined using a single mask.

The method according to the second aspect of the present invention may even further comprise the step of providing an etch stop layer on at least part of the second part of the bottom cladding layer prior to deposition of the core layer, said core layer extending on both the first and the second part of the bottom cladding layer thereby covering at least part of the etch stop layer.

The formation of the optical waveguide and the first alignment features preferably comprises the steps of:

a) defining the horizontal configuration of the optical waveguide and the first alignment features in the core layer by a single mask process, b) partially removing the core layer thereby forming the optical waveguide and is defining the first alignment features in the core layer, c) removing that part of the etch stop layer not being covered by the core layer, d) providing a top cladding layer so as to at least partly cover the optical waveguide and optionally the one or more alignment features formed in the core layer, and e) removing the top-cladding layer, the core layer and at least part of the second part of the bottom cladding layer to thereby form the first alignment features in the bottom-cladding layer.

The etch stop layer defining the one or more alignment features formed in the bottom cladding layer may optionally be totally removed or only partly removed. If the etch stop layer is only partly removed the remaining layer may be used to adjust the height of the optoelectronic device relative to the optical waveguide.

The removing in step e) may comprise etching the second part of the bottom cladding layer so as to expose that part of the substrate not being covered by the first alignment features. Preferably, the etching process involves an anisotropic etch, such as reactive ion etching.

Preferably, the first alignment features comprises two alignment features having outwardly tapered side, surface parts, said two alignment features being separated by a distance larger than or equal to the width of the active part of the optoelectronic device. The one or more second alignment features are arranged on the bottom of the optoelectronic device so as to at least partly engage the outer side walls of the first alignment features while aligning the optoelectronic device. The second alignment features may comprise solder stripes so as to electrically connect the optoelectronic device to e.g. a power supply. Preferably, at least two solder stripes are arranged on the bottom of the optoelectronic device.

The method according to the second aspect of the present invention may further comprise soldering the optoelectronic device to one or more electrical contact pads formed beside the alignment features on exposed parts of the substrate. Preferably, soldering is performed by applying heating the solder stripes above a certain melting temperature. If e.g. a bad connection has been established during soldering, or the optoelectronic device turns out to be malfunctioning, the device may be removed by heating the assembly and thereafter replaced with new device.

The optoelectronic device may comprise any kind of light source, such as a laser diode or an LED. The laser diode may be a semiconductor laser diode.

In a third aspect, the present invention relates to an assembly structure comprising:

a substrate having one or more first alignment features disposed thereon, and a first photonic device having a light input or output port for receiving or emitting light along a first optical axis, and having a bottom surface having one or more second alignment features disposed thereon, the assembly structure being characterised in that:

th one or more first or second alignment features forms a first and a second side surface part which are tapered in directions at least substantially parallel to the first optical axis, and the first photonic-device is positioned on top of at least one of the one or more first alignment features, whereby two or more surface parts of the one or more first alignment features abuts two or more surface parts of the one or more second alignment features, the abutting surface parts comprising the first and second side surface parts.

As in the case of the first aspect, providing a tapering in a direction at least substantially parallel to the first optical axis, the inherent inaccuracy of the position and shape of the first and second alignment features primarily affects the less critical positioning along the first optical axis.

The assembly structure according to the third aspect of the present invention may further comprise:

a second photonic device comprising a light input or output port for receiving or emitting light along a second optical axis, and comprising a bottom surface having one or more second alignment features disposed thereon, wherein the one or more first or second alignment features provides a third and fourth side surface part which are tapered in directions at least substantially parallel to the second optical axis, and the second photonic device is positioned on top of at least one of the one or more first alignment features, whereby two or more surface parts of the one or more first alignment features abuts two or more surface parts of the one or more second alignment features, the, abutting surface parts comprising the third and fourth side surface parts.

The light input or output port of the first and/or second photonic device may have a predetermined orientation and height with respect to the substrate. This predetermined orientation and height determines the optical axis along which the photonic device may receive or: emit light. In most cases, a photonic device does not define one unique optical axis since it may receive or emit light propagating along a smell range of directions such as directions within a cone radiating from the input or output port. Hence in such cases the first optical axis may be defined as the centre axis of such a cone. Alternatively, the optical axis may be defined by other features of the assembly structure such as another input or output port coupling light to/from the photonic device.

In one example, the first photonic device comprises a light input port and the second photonic device comprises a light output port. The photonic devices are positioned so as to align the light input port of the first photonic device with the light output port of the second photonic device. This example could be the situation where a light source, such as a semiconductor laser or an LED, is aligned with a light receiving input end of an optical waveguide, such as an optical fibre or a planar waveguide, so as to couple electromagnetic radiation from the optoelectronic device to the optical waveguide. In this case the first optical axis may be defined as the straight line between the output and the input ports.

In another example, the first photonic device and the second photonic device both have a light output port, and the photonic devices are positioned so as to align the two light output ports along two parallel optical axes. This example could be the situation where two semiconductor laser diodes, are to be aligned relative to each other so as to e.g. emit two substantially parallel beams of electromagnetic radiation.

The second alignment features of the first and/or second photonic device may comprise one or more solder stripes. Preferably, at least two solder stripes are arranged on the bottom of a photonic device.

A photonic device may comprise an active waveguide component, such as an optical amplifier, such as a fibre amplifier.

In a fourth aspect, the present invention relates to a method of forming an assembly structure, said method comprising the steps of:

providing a substrate having one or more first alignment features disposed thereon, providing a first photonic device having a light input or output port for receiving or emitting light along a first optical axis, and having a bottom surface having one or more second alignment features disposed thereon, wherein the one or more first or second alignment features forms a first and a second side surface part which are tapered in directions at least substantially parallel to the first optical axis, the method further comprising the step of:

positioning the first photonic device on top of at least one of the one or more first alignment features, whereby two or more surface parts of the one or more first alignment features abuts two or more surface parts of the one or more second alignment features, the abutting surface parts comprising the first and second side surface parts.

Again, providing a tapering in a direction at least substantially parallel to the first optical axis, the inherent inaccuracy of the position and shape of the first and second alignment features primarily affects the less critical positioning along the first optical axis. Either of the first or second alignment features held by the substrate or by the photonic device may comprise the tapered side surface parts. Optionally, both the first and second alignment features are tapered.

The method may further comprise the steps of:

providing a second photonic device comprising a light input or output port for receiving or emitting light along a second optical axis, and comprising a bottom surface having one or more second alignment features disposed thereon, wherein the one or more first or second alignment features provides a third and fourth side surface part which are tapered in directions at least substantially parallel to the second optical axis, and positioning the second photonic device on top of at least one of the one or more first alignment features, whereby two or more surface parts of the one or more first alignment features abuts two or more surface parts of the one or more second alignment features, the abutting surface parts comprising the third and fourth side surface parts.

For most applications the light input or output port of a photonic device has a predetermined orientation and height with respect to the substrate. This predetermined orientation and height determines the optical axis along which the photonic device may receive or emit light.

Different schemes may arise. The first photonic device may have a light input port whereas the second photonic device may have a light output port. The situation may also be that the first photonic device and the second photonic device may both have a light output port. In both cases the first and second photonic devices are positioned relative to each other so as to align the input/outputs so that electromagnetic radiation propagates substantially along at least one predetermined optical axis.

Preferably, the height of the first alignment features may be adjusted so as to obtain vertical alignment. Thee engagement of the first alignment features and the second alignment features ensures horizontal alignment. Thus both vertical and horizontal alignment can be achieved prior to fixation of a photonic device.

Preferably, it is the first alignment features, held by the substrate, which provides the tapered side surface parts. In order to provide aligned of the first and second photonic device, the first alignment features providing the first to fourth tapered side surface parts are formed in a single mask step. The second alignment features of the first and/or second photonic device may comprise one or more solder stripes. Preferably, at least two solder stripes are arranged on the bottom of each photonic device.

A photonic device may comprise a passive optical component, such as an optical waveguide, such as an optical fibre or a planar waveguide. A photonic device may also comprise an optoelectronic device, such as a laser diode or an LED. Finally, a photonic device may comprise an active waveguide component, such as an optical amplifier. In order to achieve amplification, the active waveguide may comprise rare-earth materials, such as erbium.

In yet another aspect, the invention relates to an assembled structure comprising a first, lower structure part and a second, upper structure part, wherein:

the first structure part comprises:
a first substrate, an upper surface of which defines a first plane, the substrate comprising a first and a second part
a first radiation guiding, emitting, and/or receiving means positioned on or above the first part of the first substrate and in a fixed relation thereto, the means defining a first optical axis extending at least substantially parallel to the first plane,
one or more first alignment elements positioned on or above the second part of the first substrate, the one or more first alignment elements having one or more upper surface parts being in a fixed relationship to the first optical axis and the first plane, and the one or more first alignment elements having one or more side surface parts being positioned in a predefined position in relation to the first optical axis, the second structure part comprises:
a second substrate having a lower surface defining a second plane being at least substantially parallel to the first plane,
a second means for guiding, emitting, and/or receiving radiation, the means defining a second optical axis and being positioned below the second substrate and in a fixed relation thereto,
one or more second alignment elements positioned below the second substrate, and the one or more second alignment elements having one or more side surface parts being positioned in a predefined position in relation to the second optical axis, the second structure part having one or more lower surface parts being in a fixed relationship to the second optical axis and the second plane, the one or more first and second alignment elements being relatively positioned so that, when the first and second optical axes are at least substantially coincident:

at least part of the one or more upper surface parts of the one or more first alignment elements abut at least part of the one or more lower surface parts of the second structure part, at least part of the one or more side surface parts of the one or more first alignment elements abut at least part of the one or more side surface parts of the one or more second alignment elements, and the abutting side surface parts of at least one of the one or more first and second alignment elements comprising at least two surface parts extending in different planes, at angles different from 0 and 90 degrees from the first optical axis.

This has the advantage that the abutting side surface parts and upper and lower surface parts may be positioned so as to, when projected perpendicularly onto the first plane, reside within en area within the first plane, the area being defined as the overlap between the first and second parts when these are projected perpendicularly onto the first plane. Thus, all engaging parts or surfaces may not comprise any parts of those edges of the structure part created by separation following a mass manufacturing of such structure parts.

Normally, a large number of such structure parts are prepared in the same process and on the some wafer. Separation is performed subsequently by simply cutting or breaking the wafer with the structure part. Such separation will normally not result in edges which have well defied positions and distances in relation to e.g one or more light guides or the like in the structure parts.

As mentioned above, it may b desired that the first and second parts each further comprises a set of electrical contact pads positioned so as to abut or engage and thereby provide electrical contact between the contact pads of the first and second parts.

In a preferred embodiment, the second alignment elements comprise at least one, such as at least two, solder stripes, and the first structure element comprises at least one contact pad positioned so as to abut or engage the at least one solder stripe of the second part. In this situation, the first and second structure parts may be fixedly interconnected at least in part by an engagement, such as a soldering, between the solder stripe(s) and contact pad(s).

Naturally, the overall positioning and fastening of the two structure parts entails no demands as to the function or operation of the two radiation guiding, emitting, and/or receiving means of the two structure parts. Thus, the radiation guiding, emitting, and/or receiving means of at least one of the first and second structure parts may, e.g., comprise:

a waveguide, such as an optical fibre or a planar waveguide, where the optical axis is defined by a longitudinal axis of the waveguide, a light emitter, such as a semiconductor laser diode or an LED, and where the optical axis is defined as an axis of symmetry of radiation emitted by the light emitter, and/or an active waveguide component, such as an optical amplifier, such as a fibre amplifier, where the optical axis is defined by a longitudinal axis of the waveguide.

One of the advantages of the present assembly may be seen, as, in the first structure part, the one or more upper surface parts may define a plane at least substantially comprising a lower side of the first means for guiding, emitting and/or receiving radiation. This provides the advantage, as mentioned above, that the inter-positioning thereof may be obtained with a good precision.

In order to obtain a precise and reproducible positioning of the structure parts, the abutting side surface parts of one of the first and the second structure part preferably define an outwardly tapered part, viewed from the respective means for guiding, emitting, and/or receiving radiation and wherein the abutting side surface parts of the other of the first and the second structure part preferably define an inwardly tapered part, viewed from the respective means for guiding, emitting, and/or receiving radiation. In this manner, the two tapered parts may be adapted to fit in a manner so that a quick and error-free connection is obtained.

In that situation, it is preferred that, in one or both of the first and second structure part, the one or more alignment elements are positioned so as to provide a space at least corresponding to a; cross section of an active part of the means for guiding, emitting, and/or receiving radiation, the cross section being translated along the respective optical axis over the second part of the respective structure part. In that manner, radiation guiding, emitting, and for receiving means having such dimensions may be positioned in that space in order to optically fit the other radiation guiding, emitting, and/or receiving means.

In yet another aspect, the invention relates to a first and/or a second structure part for use in the assembled structure.

Also, an aspect of the invention relates to a method of manufacturing a first structure part for use in the assembled structure, the method comprising:

1. providing a substrate having a first and a second part,
2. providing a means for guiding, emitting, and/or receiving light, the means defining an optical axis, the means being positioned on or above the first part of the substrate and so as to be fixed in relation to the substrate and so that the optical axis is in a predetermined relation to the substrate,
3. providing one or more alignment elements on or above the substrate, the one or more alignment elements being positioned:

on or above the second part of the substrate, so that the one or more alignment element has/have one or more upper surface parts being in a fixed relationship to the first optical axis and the first plane, and so that the one or more first alignment element has/have one or more side surface parts being positioned in a predefined position in relation to the first optical axis.

Preferably, steps 2) and 3) comprise the steps of:

I. providing a first layer of a first material on or over at least substantially all of an upper surface of the first and second parts of the substrate, the first material having a first effective refractive index, II. providing a second layer of a second material on at least substantially all of an upper surface of the first layer and at least over or at the first part of the substrate, the second material having a second effective refractive index being different from the first effective refractive index, and III. removing a predetermined part of the second layer.

Advantageously, steps 2) comprises providing between steps I) and II), a third layer of a third material on the upper surface of the first layer and at least over or ax the second part of the substrate. Preferably, the third material are adapted to withstand a process of removing at least part of the first layer.

Also, it is desired that:

step II) comprises providing the second layer also on the third layer, step III) comprises the steps:

a) predefining the parts, both over or at the first and second parts of the substrate, of the second layer which should be removed, b) removing the predefined parts of the second layer.

In that situation, step 2) may comprise providing, at least over or at the first part of the substrate, a fourth layer of a fourth material on the structure resulting after step b), the fourth material having a refractive index being different from the second refractive index.

Step III) may further comprises removing those parts of the third layer on which predefined parts of the second layer are positioned.

In that situation, step 3) preferably further comprises removing all remaining parts of the second layer on or above the second part of the substrate.

Also, step 2) preferably further comprises removing at least substantially all parts of the first layer, which parts correspond to parts of the third layer removed during step b).

Preferably, step III) further comprises removing at least substantially all remaining parts of the third layer above or at the second part of the substrate.

A major advantage of the invention is that step a) may comprise predefining the parts in a single step. Naturally, this may be obtained using virtually any technique. However, at present, it is preferred to use a lithographic process and by using a single mask.

It is also preferred that the further removing step of step 3) is performed using a predefined removal procedure, such as an etching procedure, such as reactive ion etching, and wherein step II) comprises providing a third layer of a third material, such as an etch stop, which is adapted to not be removed during the predefined removal step.

Yet another aspect of the invention relates to a method of assembling an assembled structure according to claim 1, the method comprising:

providing the first and second structural parts, then positioning the first and second structural parts in order to form the assembly, and finally fixing the first and second structural parts to each other.

This firstly positioning and then fixing the parts has a number of obvious advantages, e.g. that proper functioning of each part can be checked before fixing which may be an irreversible process.

In the following, the present invention will be described in further detail with references to the figures listed below.

Figure 17A:
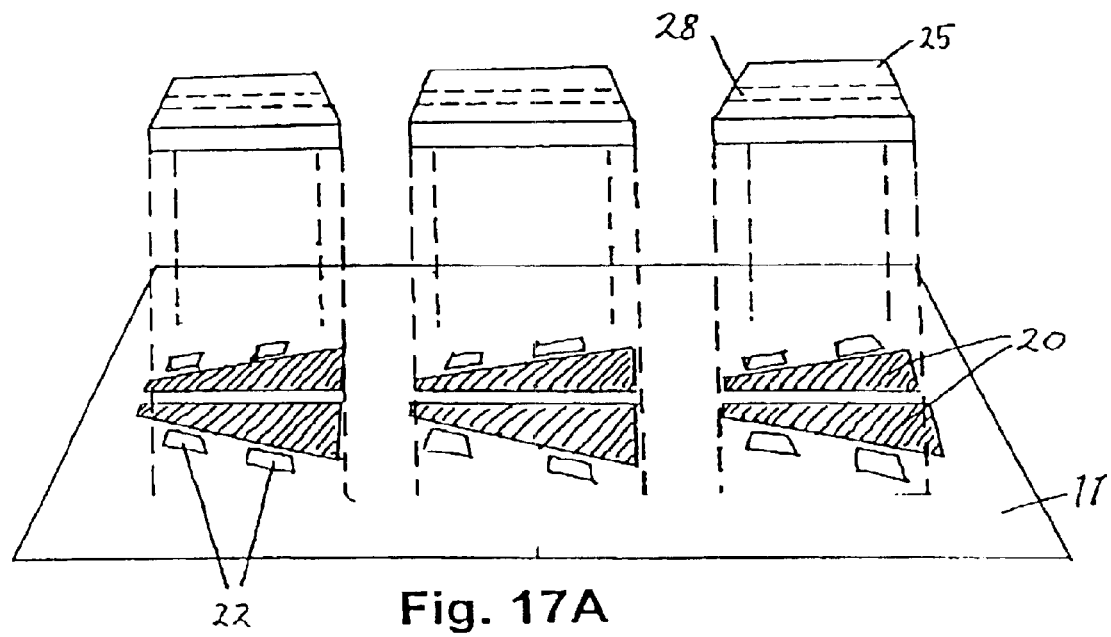

FIGS. 17A and B shows arrays of alignment tapers with photonic devices.

Figure 18:
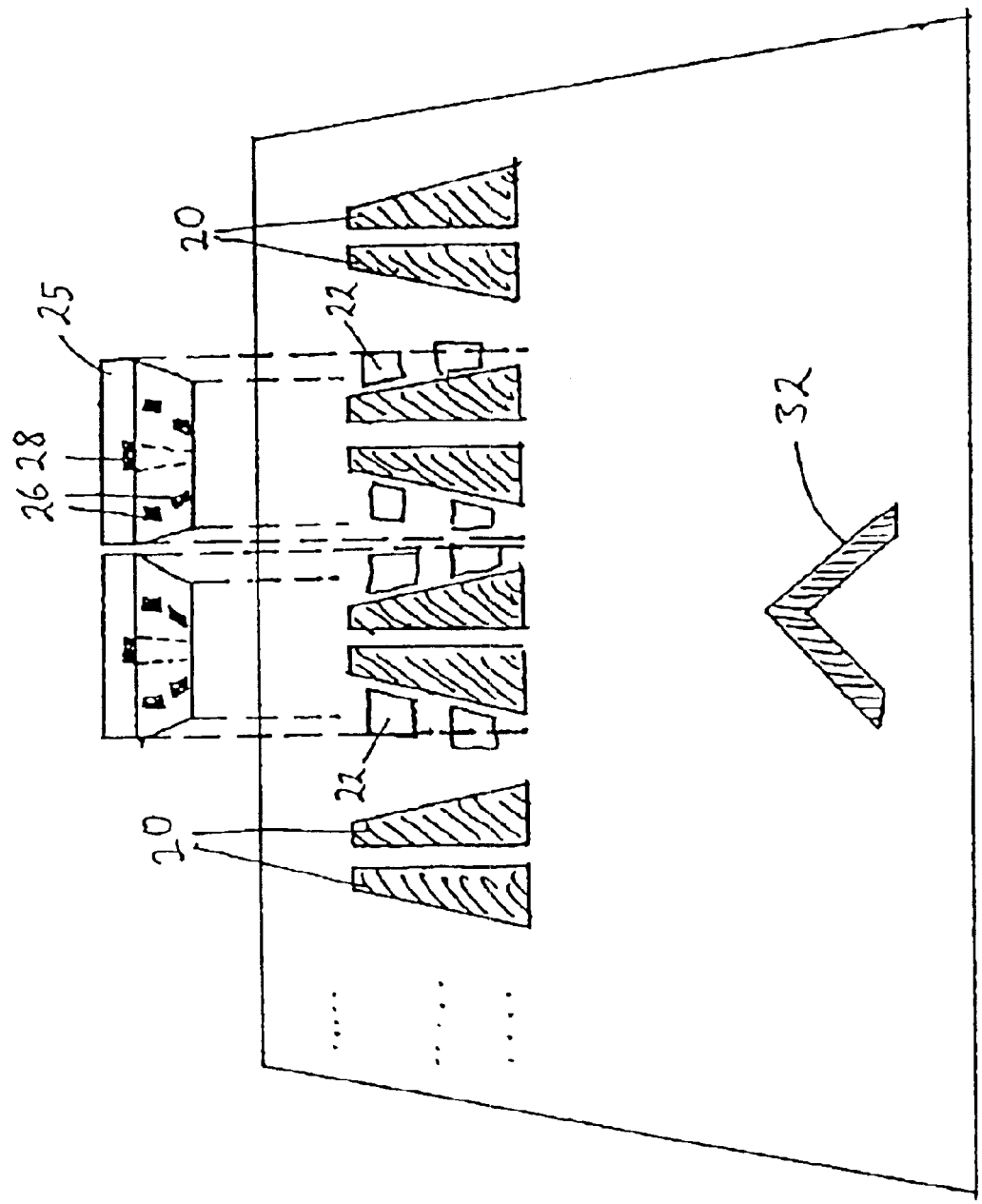

FIG. 18 shows an array of alignment tapers with photonic devices on a substrate also holding other features.

Figure 19:
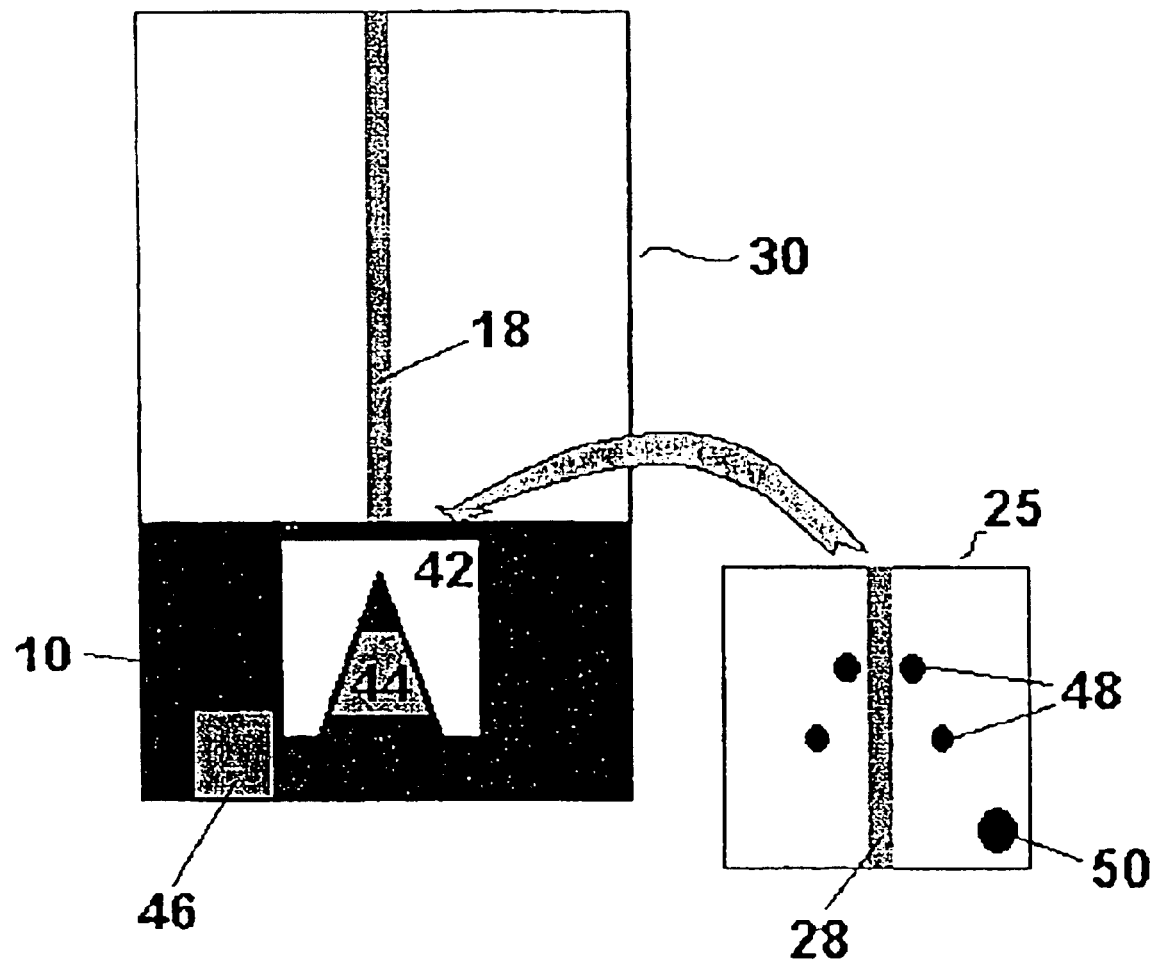

FIG. 19 shows an alternative embodiment of the tapered alignment features of the present invention.

Figure 20A:
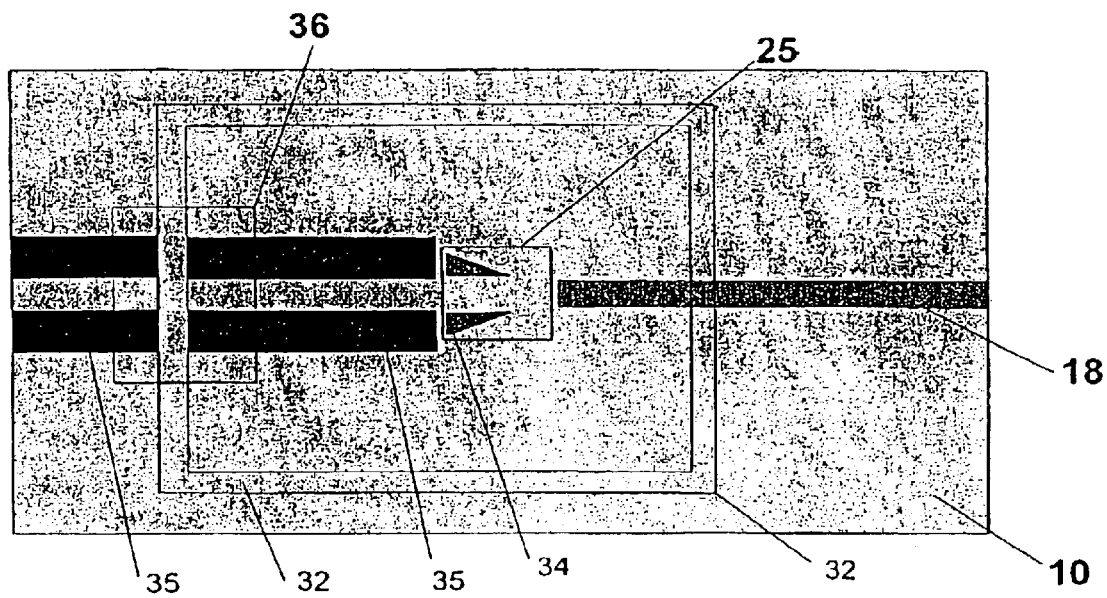

FIGS. 20A and B are top and cross sectional views of how an efficient sealing may be provided to an assembly structure according to the present invention.

The fabrication of the structures to be applied in hybrid integration procedures according to the present invention makes use of standard semiconductor technology. The invention can be realised in a plurality of embodiments of which only a representative selection is described here.

In a first embodiment the present invention relates to an assembly structure for performing hybridisation of an optoelectronic device onto a substrate holding a waveguide. An optoelectronic device can be a light emitting component such as a laser or a Light Emitting Diode (LED), or a light receiving component such as a photodiode. The hybrid integration includes aligning the laser and the waveguide, and soldering the laser to the substrate securing a long term mechanical stability.

The description of this first embodiment also serves as a general description of the essential features involved in the present invention. Therefore not all steps and features included in this description are necessary in order for the invention to be realised, and the description should by no means be interpreted as limiting the scope of the invention. The composition of the assembly structure is best described by going through the stepwise manufacturing procedure with reference to FIGS. 2–13.

Figure 1:
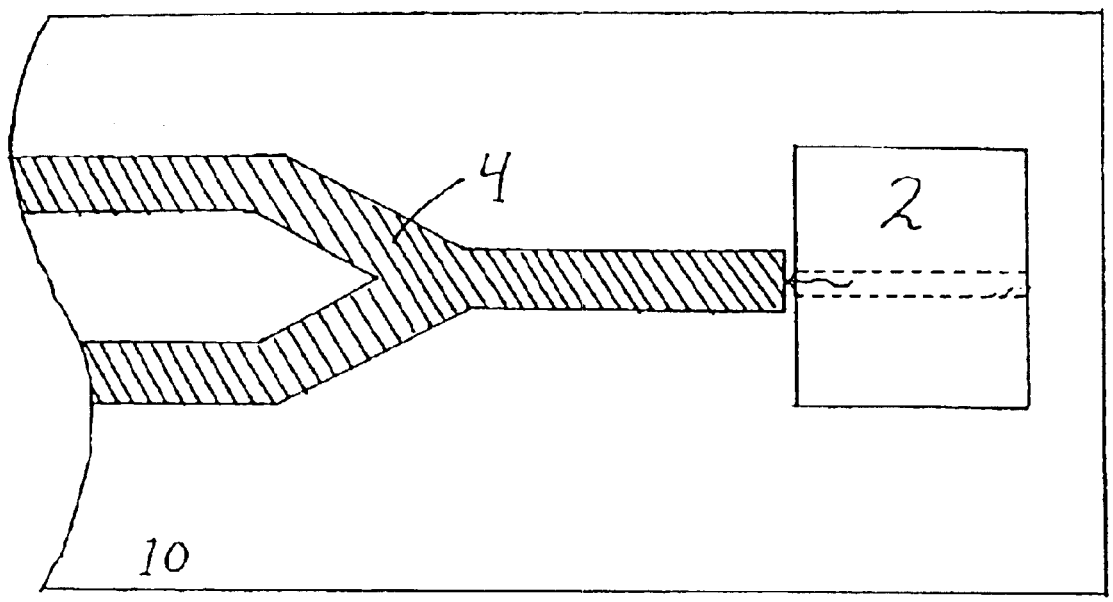
FIG. 1 shows typically optical chip including a hybrid integrated pump laser and a waveguide.
Figure 2:
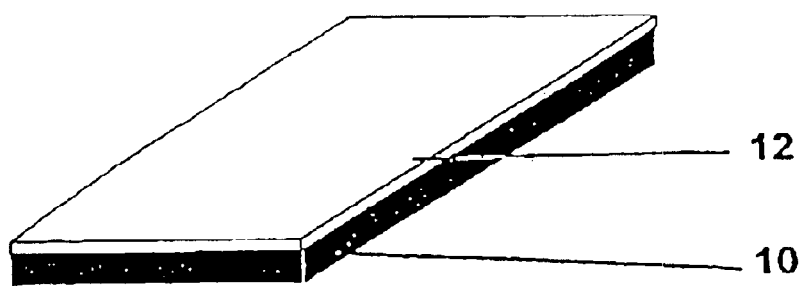
FIG. 2 shows the first step of fabricating the assembly structure, in which a bottom cladding is deposited on a silicon substrate.
Figure 3:
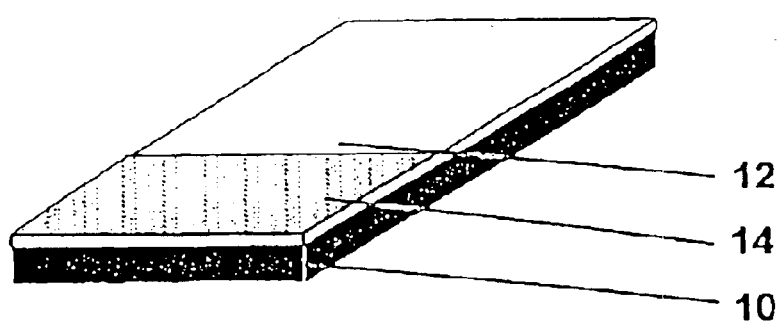
FIG. 3 shows a polysilicon etch stop applied on part of the bottom cladding.
Figure 4:
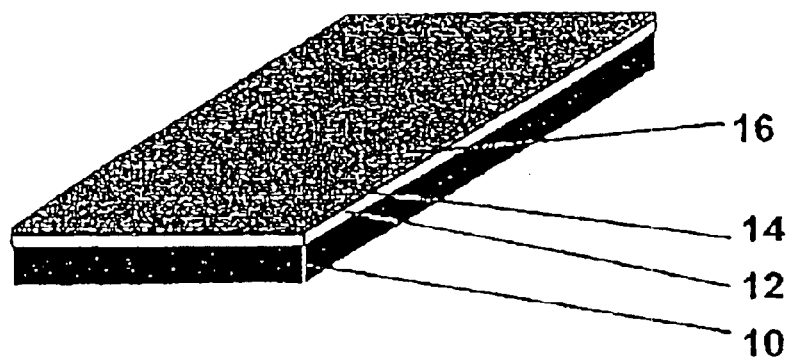
FIG. 4 shows a layer of core glass applied on the structure of FIG. 3.

FIG. 2 shows the first step of fabricating the assembly structure, in which a bottom cladding layer 12 is deposited on a substrate 10. Preferably the substrate is composed of Silicon or other inorganic or organic substrate material; the bottom-cladding layer is $SiO_2$ or other materials different from the core material to be deposited later. For practical purposes, the shown structure is nominally divided into a first part (in the back) and a second part (front). FIG. 3, an etch stop 14 is deposited on the second part of the bottom cladding. Possible etch stop materials are polysilicon, Boron doped polysilicon, metals or other inorganic materials. The next step consists of covering the structure with a deposited layer 16 of core glass, typically Germanium doped $SiO_2$ or other materials different from the cladding material, as shown in FIG. 4.

The depositing of cladding, etch stop and core glass layers can be carried out using Plasma Enhanced Chemical Vapour Deposition (PECVD), Low Pressure Chemical Vapour Deposition (LPCVD), or some vacuum deposition technique.

Figure 5:
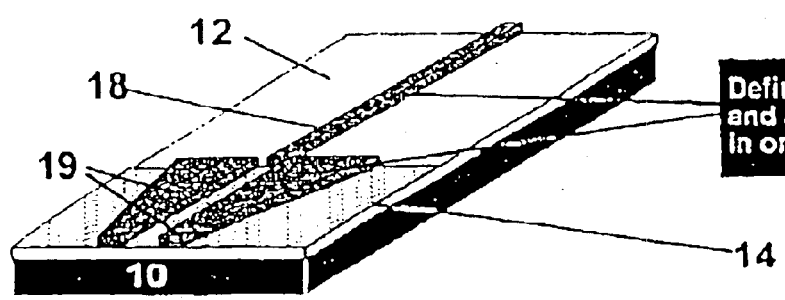
FIG. 5 shows the structure of FIG. 4 after an etching step defining the waveguide and alignment taper templates.

In FIG. 5, the formation of the waveguide core and alignment taper templates is carried out by a photolithographic process. First, the core glass layer is deposited onto the Si wafer. Next, the waveguide core and alignment taper templates are defined in the resist in the same photoresist processing step. The following RIE process removes the surrounding core glass material, leaving only the waveguide core 18 and the alignment taper templates 19. It is in this step that the essential horizontal alignment takes place. Since the waveguide core and the alignment taper templates are defined simultaneously in one mask step, the precision of the horizontal alignment is very precisely defined.

When working with optics in general, one often takes precautions to avoid back-scattering from surfaces such as input/output facets. The photolithography mask step described above provides a simple measure for doing this in the present invention. By changing the illumination mask, the end of the waveguide core can be defined having an angled termination, hence any reflection from this surface will leave the system.

Figure 6:
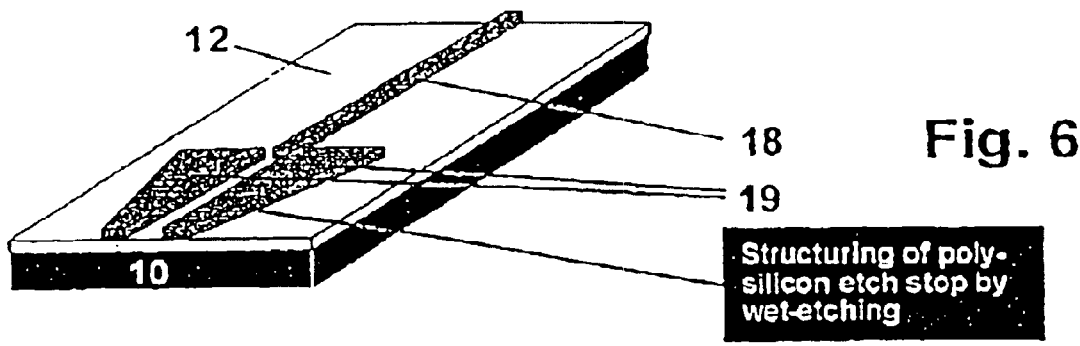
FIG. 6 shows the structure of FIG. 5 after removal of the accessible polysilicon etch stop.
Figure 7:
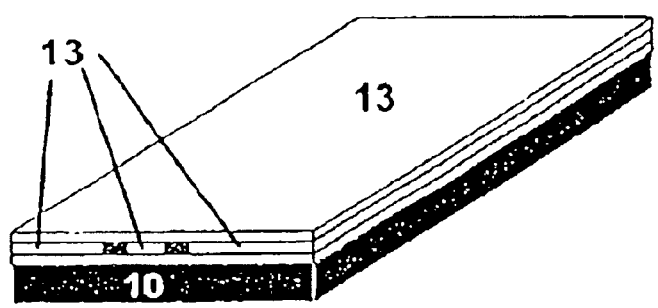
FIG. 7 shows several top cladding layers applied on the structure of FIG. 6.
Figure 8:
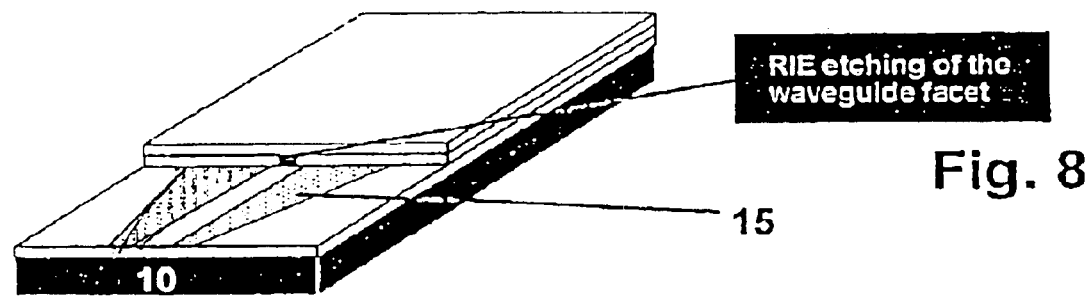
FIG. 8 shows the structure of FIG. 7 after removal by etching of the front part of the top cladding and alignment taper templates.

The polysilicon etch stop 14 not covered by the alignment taper templates are removed by wet- or dry etching, exposing the bottom cladding layer, see FIG. 6. The waveguide core has to be covered by a material for it to be able to guide electromagnetic radiation. There exist several choices of materials for embedding the waveguide core for it to be able to guide electromagnetic radiation. These can be defined using parameters such as refractive index. This is done in FIG. 7 where a top cladding layer 13, preferably similar to the bottom cladding layer, is deposited on the structure of FIG. 6. This cladding layer is removed again in an RIE process, but only from the second part of the structure, resulting in the structure in FIG. 8.

Figure 9:
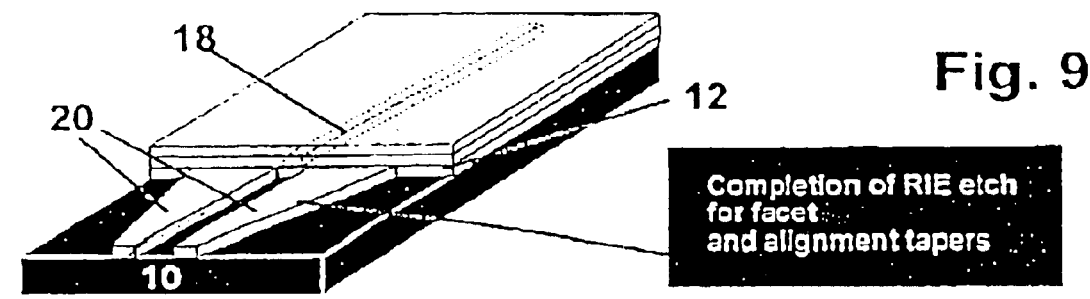
FIG. 9 shows continued etching of the structure of FIG. 8 completing the alignment tapers.

Completion of the etching process in FIG. 9 forms the alignment tapers 20 in the bottom cladding 12. Going from FIG. 8 to 9, the etch stop mask 15 is also removed, revealing the top surface of the alignment tapers. It is important to note that the top surface of the bottom cladding layer 12 forms both the top surface of the alignment tapers and the surface on which the waveguide core 18 is deposited, that is, these are in the same plane. Thereby a very precise vertical alignment can be achieved by placing the object to be aligned on top of the alignment tapers.

Figure 10:
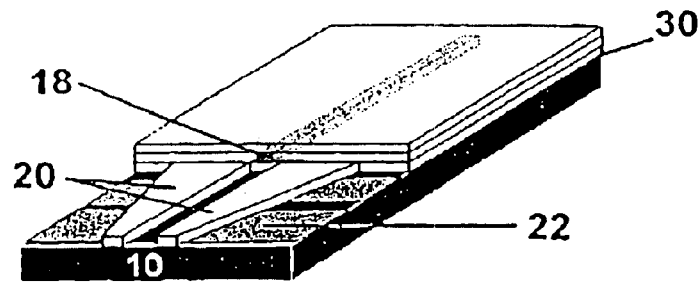
FIG. 10 shows metal pads serving as laser electrodes and thermal paths applied on the structure of FIG. 9.

A number of metal pads 22 are deposited on the exposed part of the silicon substrate 10 next to the alignment tapers 20 as shown in FIG. 10. These metal pads serve as wetable regions for binding solder to the substrate in a later soldering (see e.g. FIG. 16). After this soldering, the pads also serve as both thermal paths to the silicon substrate, and as electrical contacts for the optoelectronic device. The depositing of the metals can be carried out by electroplating or vacuum deposition techniques.

As can be seen from FIG. 10, the whole assembly structure 30 is deposited on the substrate 10, and therefore no etching of trenches and groves in the silicon wafer is needed.

Figure 11:
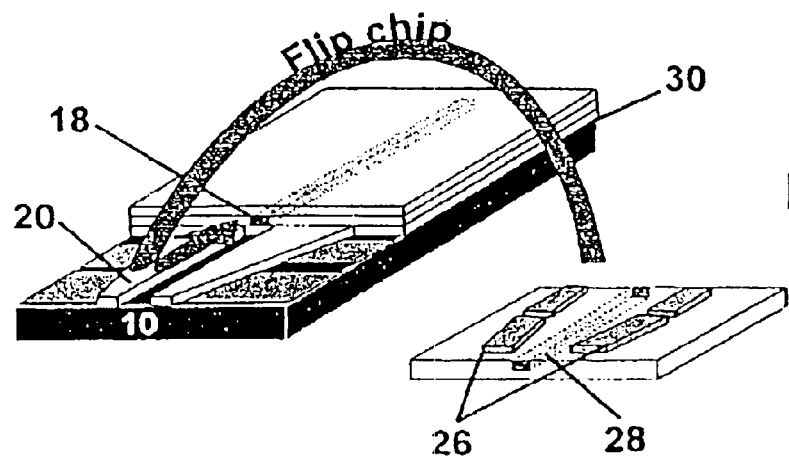
FIG. 11 shows a photonic device to be applied on top of the structure of FIG. 10.

Referring now to FIG. 11, the opto-electronic device 24, a semiconductor laser in the preferred embodiment, is presented upside down showing the active region 28 to be aligned with the waveguide. The active region preferably resides so as to have its optical axis elevated above the bottom surface of the laser a distance equal to the distance of the optical axis of the waveguide above the bottom cladding layer. The exact position of the active region will be commented on later.

The laser 24 also holds one or more alignment features, here in the form of one or more solder stripes 26, which are deposited symmetrically on the bottom surface of the laser, with the active region 28 in the centre. One alignment step with the active region of the laser as reference will be needed in depositing the solder stripes, the accuracy of which is typically 0.2 µm. Electroplated stripes of AuSn80 having very smooth surface structures is the preferable solder material in the present invention. Semiconductor lasers are often fragile and need a very gentle handling. Since the solder stripes are "add-on" there is no need for etching the laser, which is considered a major advantage.

To perform the alignment, the laser 24 is flipped according to the arrow in FIG. 11, for the solder stripes 26 to fit the alignment tapers 20. Thereafter the laser is slid towards the first part of the assembly structure, until the solder stripes abut the alignment tapers, as is achieved in FIG. 12. This last action is where the alignment with the waveguide takes place and the tapering of the alignment tapers 20 guides or interlocks the laser 24 so that the active region 28 is aligned with the waveguide core 18. The laser now rests upon the alignment tapers which ensures the vertical alignment (note the vertical position of the active region described above), and the solder stripes clamps the alignment tapers ensuring the horizontal alignment. Thus both vertical and horizontal alignment has been achieved, and due to the clamping of the solder stripes to the alignment tapers, they are held together firmly without being inseparable.

Figure 12:
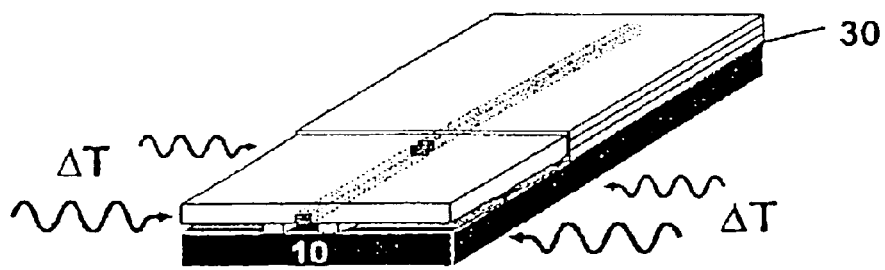
FIG. 12 shows the aligned assembled structure while melting the solder stripes for fastening.
Figure 13:
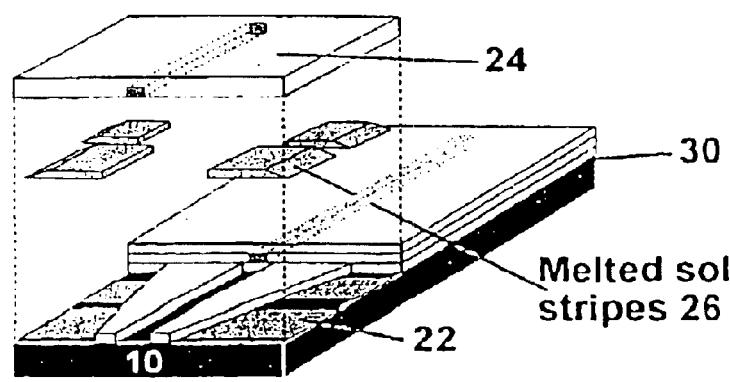
FIG. 13 shows an exploded view of the structure of FIG. 12 revealing the melted solder stripes.

The horizontal alignment is only sensitive to the relative alignment of the solder stripes 26 to the active region 28. As long as the solder stripes are positioned symmetrically, any amendments of their separation will change the gap between the laser and the waveguide, but not result in lateral misalignment. In FIG. 12, the aligned and assembled structure is shown while melting the solder stripes for fastening the optoelectronic device. FIG. 13 shows an exploded view of the structure of FIG. 12 revealing the melted solder stripes.

Figure 14:
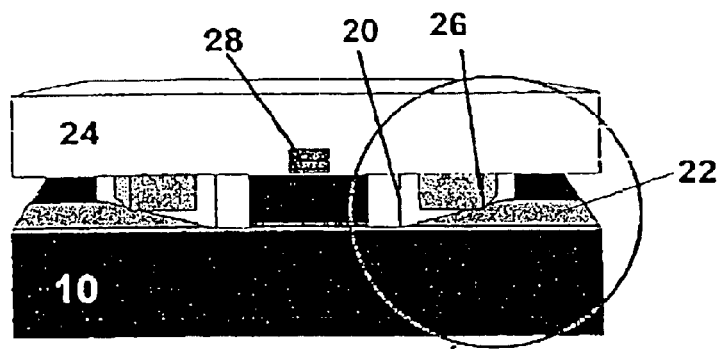
FIG. 14 is a front view of the aligned assembled structure.
Figure 15:
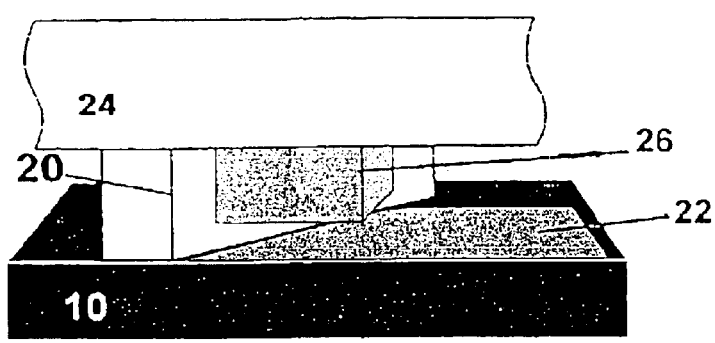
FIG. 15 is a close up on FIG. 14 showing the solder stripes, the alignment tapers and the metal pads.
Figure 16:
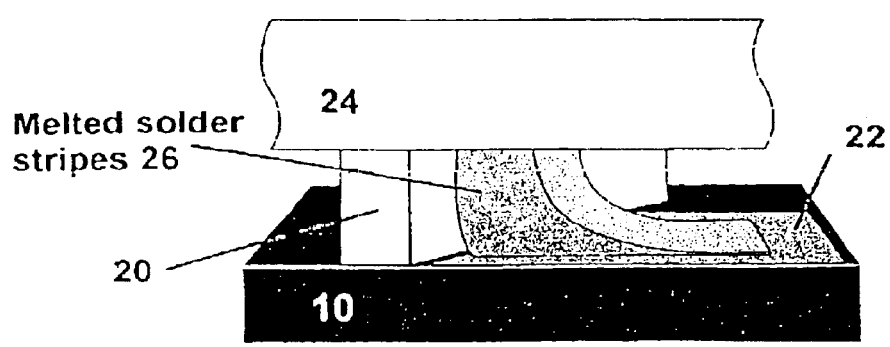
FIG. 16 shows the same as FIG. 15 after melting the solder stripes.

The alignment and fastening: procedure performed in FIGS. 11 to 13 are described in detail referring to FIGS. 14 to 16. FIG. 14 shows a front view of FIG. 12 where it is seen that the solder stripes 26 position the active region 28 precisely between the alignment tapers 20. From the close-up in FIG. 15 it is seen that the solder stripes contributes solely to the horizontal alignment, and therefore the height of the solder stripes is only restricted by the height of the alignment tapers. It is with noting that the alignment is performed prior to fastening of the optoelectronic device, hence any errors or inaccuracies obstructing a perfect alignment can be detected, and the fastening rejected.

After alignment, the melting of the solder stripes 26 effected from FIG. 15 to 16 is carried out by heating the assembled structure. In FIG. 16, the solder bulges up, wets, and excess solder flows along the metal pads 22 to make both thermal and electrical contact to the silicon substrate 10. This contact enables power supply to the laser 24 and enhances its temperature stability since it is over a broad area. Making additional wire bonding to the laser will heat the assembly considerably, however, since the laser rests on top of the alignment tapers, softening of the solder does not present a problem.

In the description of the assembly structure above (FIG. 11), it was implied that the active region 28 was residing a certain height above the bottom surface of the laser 24. However, in specific optoelectronic devices, the region to be aligned with the waveguide resides some given height above the bottom surface, inside the device, not being equal to the height of the centre of the waveguide core. This will cause the region 28 to be either elevated or lowered relative to the waveguide centre, when the device is mounted.

Two embodiments of the present invention addresses this problem, a first applies where the active region is elevated relative to the waveguide core centre, and a second when it is lowered.

First embodiment: The waveguide core 18 can be elevated by depositing a second cladding layer prior to formation of the core layer (16 in FIG. 4) by vacuum deposition. Instead of resting on the top surface of the bottom cladding layer, the waveguide core 18 in FIG. 5 now rests on the remaining part of the second cladding layer, resting on the bottom cladding layer 12. This will elevate the waveguide a distance equal to the thickness of the second cladding layer above the top surface of the bottom cladding layer. Referring now to FIG. 9, the top surface of the alignment taper 20 will still be in the plane of the top surface of the bottom cladding layer 12. Since the thickness of the second cladding layer is known, the top surface of the alignment tapers 20 is still well defined relative to the waveguide.

Second embodiment: The mounted device can be elevated relative to the waveguide by increasing the height of the alignment tapers. This is easily done by leaving all or part of the etch stop mask 15 in FIG. 8 otherwise removed after the etching of the cladding layers. Adjusting the original thickness of the etch stop layer allows the mounted device to be elevated a given height relative to the waveguide.

These two well-defined height adjustments using only the thickness of a single layer, permits a precise vertical alignment of the waveguide and the opto-electronic device, also when the region to be aligned resides some given height above the bottom surface, i.e. inside the opto-electronic device.

Alternative embodiments of the present invention exist when the object is to align several photonic devices either relative to each other, or relative to another object. Here, a photonic device refers to both opto-electronic components and other optical devices such as amplifying waveguides. In this case there may not be a waveguide in the assembly structure. The alignment tapers will be positioned in either of two ways, as described in FIGS. 17 and 18:

1. a number of alignment tapers 20 defined in one mask step, and formed in the same cladding layer with the top surfaces of all tapers being in the same plane (FIGS. 17A and B), or
2. a number of alignment tapers 20 defined and formed as in 1, but the one mask step including the definition of another feature 32 on the substrate (FIG. 18). This other feature could be a photonic device or another alignment feature.

The embodiment addressed in FIG. 17A applies where two or more photonic devices are hybrid integrated after each other in a line. Contrary to the waveguide in the assembly structure described above, none of the photonic devices to be aligned are formed on the substrate. The two or more photonic devices 25 have light input/output ports, which are to be internally aligned in order to acquire an efficient light coupling between them.

Figure 17B:
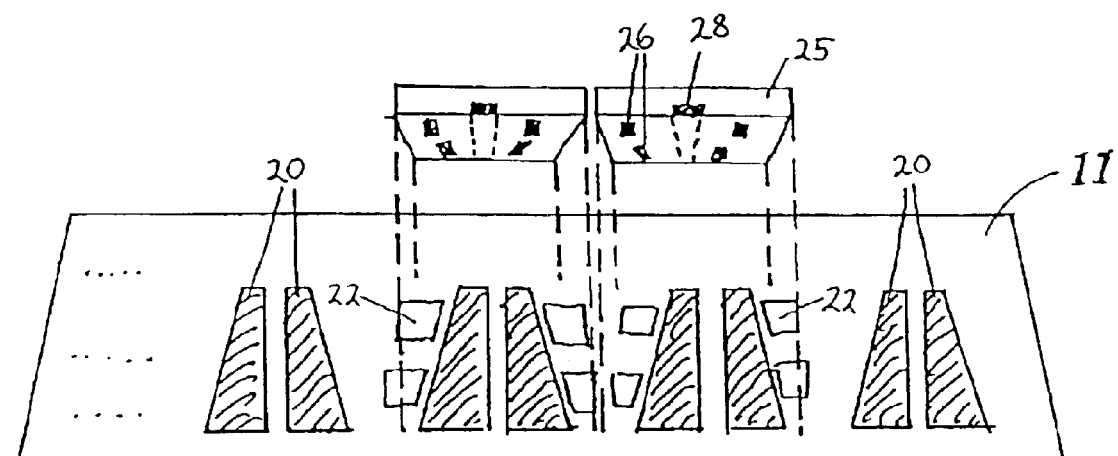

In the embodiments shown in FIGS. 17B and 18 the alignment tapers and the attached device(s), are oriented relative to an imaginary frame of reference. The alignment will be both an alignment and a three-dimensional positioning with a high precision in especially the transverse directions relative to the alignment tapers.

These two embodiments can be utilised when e.g. an array of photonic devices is desired. The array of alignment tapers can be formed as described in 1 above (FIG. 17B), on a separate substrate 11, which thereby holds an array of internally aligned devices 25. Or, as described in 2 (FIG. 18), the array can be formed and internally aligned on a substrate holding other features such as 32, the array being aligned relative to these features also. The procedure of forming the alignment tapers and attaching the device are essentially the same as in the embodiment described in with reference to FIGS. 2 through 13.

The one or more tapered alignment features according to the present invention may have different shapes. In an alternative embodiment, a tapered alignment feature is formed which provide the tapered side surface parts as inner side surface parts as illustrated in FIG. 19. Here, an assembly structure is formed on a substrate 10 holding a waveguide 18 and the tapered alignment feature 42. In order to improve the precision of the assembly, the waveguide 18 and the tapered alignment feature 42 are preferably defined in a single mask step. Also, the top surface of the tapered alignment feature 42 is preferably in the same plane as the bottom-cladding layer holding the waveguide 18. The active region 28 of an optoelectronic device 25 can be vertically aligned with the waveguide 18 by positioning the optoelectronic device 25 on top of the alignment feature 42. Second alignment features, such as solder stripes 48, positioned symmetrically around the active region 28 are formed on the lower surface of the optoelectronic device 25. The active region 28 will be horizontally aligned with the waveguide 18 when the optoelectronic device 25 is moved towards the waveguide 18 until the solder stripes 48 abut the tapered side surface parts of the alignment feature 42. In order to fix and provide electrical connections to the optoelectronic device 25, the solder stripes can be melted forming a binding electrical connection to a metallized region 44. Alternatively, the second alignment features can be formed by other structures than solder stripes 48, such as one or more silica structures. In this case, the fixation and the electrical connection can be formed by a solder stripe 50 forming a binding electrical connection to a metallized region 46.

The principles of the present invention provide a precise method for positioning and aligning devices and structure's at different positions on a substrate. Several 3-dimensional positioning and alignment arrangements of photonic devices are feasible by combining any of the above described embodiments. Also, hybrid integration, involving alignment and positioning, is of interest for numerous classes of photonic devices, which further extends the scope of the present invention.

The assembly structure of the present invention also provides an assembly which is well suited for sealing the one or more optoelectronic devices on the assembly structure.

FIG. 20 shows an application example where the processing steps for forming of the glass waveguides and the alignment features are integrated with the necessary processing steps for forming a hermetic solder seal around the optoelectronic device for protection.

FIG. 20A shows a top view of an assembly structure according to a preferred embodiment of the present invention. In parallel with the formation of the waveguide 18, a glass ring 32 is formed surrounding the mounted optoelectronic device 25 and the light input/output end of the waveguide 18. The glass ring 32 can be formed using the same processing steps, masks and materials, which was used to form the assembly structure. The upper part of the glass ring 32 holds metallized areas 35 and a solder seal ring 37 as can be seen on the cross sectional view of FIG. 20B. The glass ring 32 intersects seamlessly with the bottom and top cladding layers 31 and 52 of the waveguide structure and with a pedestal 36. A lid 40 can be soldered to the assembly structure by positioning the lid 40 on top of the assembly structure so as to make contact between the solder seal ring 37 and metallized areas 35 on the lid 40. Applying heat to the assembly will fix the lid 40 to and seal the device. The lid 40 preferably consists of silicon.

The lower surface of the glass ring 32 on the pedestal 36 encompasses electrically conductive feedthroughs 39 which preferably consist of highly doped polysilicon. The feedthroughs are connected to metallized areas 35 which is interconnected by a wire or ribbon bond 33. Metallized areas 35 together with bonds 33 and feedthroughs 39 forms electrical connections from the, outside of the sealing to the sealed optoelectronic device as can be seen on FIG. 20A. Alternatively, the electrical connections can be formed by vertical feedthroughs 41, which electrically connect top and bottom surface of the substrate 10.

As mentioned in the above, the necessary structuring for providing the sealing can be included in the processing steps used to form the waveguide and alignment features.

The structuring of the pedestal 36 and lower parts of the glass ring 32 is formed in the same processing steps and mask as the structuring of the waveguide bottom-cladding layer 31 and the alignment tapers 34 (Similar to the steps described in relation to FIGS. 5 and 9). Also, the structuring of the polysilicon feedthroughs 39 can be done in the same process step described in relation to FIG. 6. Similarly, the metallized areas 35 can be formed in the process step used to form the metallized areas 22 described in relation to FIG. 10.

Figure 20B:
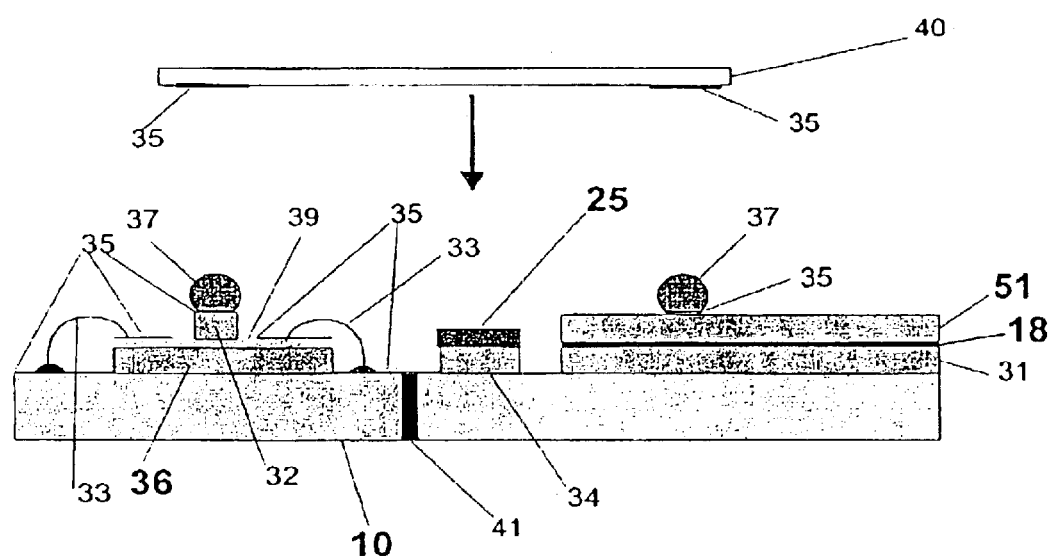

The solder seal ring 37 can be applied to the metallized glass ridge 32 as shown in FIG. 20B, but it can also be applied to metallized areas 35 the lid 40. The solder seal ring 37 consists preferably of an alloy with a lower malting point than the solder alloy used for mounting the semiconductor devices onto the first surface.

What is claimed is:

1. A method of forming an assembly structure for assembling and aligning an optoelectronic device and on optical waveguide, said optical waveguide comprising a light input end for receiving light emitted from an output port of the optoelectronic device, said method comprising the steps of:

providing a bottom cladding layer on lop of a substrate, said bottom cladding layer comprising a first and second part, wherein each part comprises a top and a bottom surface separated by a distance d, providing an etch stop layer on at least part of the second part of the bottom cladding layer, providing a core layer on top of the bottom cladding layer, said core layer extending on both the first and the second part of the bottom cladding layer thereby covering at least part of the etch stop layer, and forming an optical waveguide and one or more first alignment features on the assembly structure by:

a) defining, by a single mask process, parts of the core layer for forming an optical waveguide core and for defining a horizontal configuration of the first alignment feature(s), b) removing that parts of the core layer not defined in step a), thereby forming the optical waveguide core in the core layer and defining the horizontal configuration of the first alignment feature(s) in the core layer, said optical waveguide thereby extending along a first optical axis in a plane and at a distance larger than or equal to d from the bottom surface of the first part of the bottom cladding layer c) removing parts of the etch stop layer not covered by the core layer, d) providing a top cladding layer so as to at least partly cover the optical waveguide core and optionally the parts of the core layer providing the horizontal configuration of the fist alignment feature(s), and e) etching into the structure over the second part of the bottom cladding layer to remove the top cladding layer, the core layer and parts of the second part of the bottom cladding layer not covered by the etch stop layer, thereby forming the first alignment feature(s) in the second part of the bottom cladding layer so that at least one top surface of the first alignment feature s) is in essentially the same plane as the top surface of the first part of the bottom cladding layer, said formation of the first alignment feature(s) comprising the step of forming a first and a second tapered side surface part in directions at least substantially parallel to the first optical axis.

2. A method according to claim 1, wherein the optical waveguide extends on the top surface of the bottom cladding layer at a distance substantially equal to d above the bottom surface of the bottom cladding layer.

3. A method according to claim 1, further comprising the step of removing the etch stop layer defining the one or more alignment features formed in the bottom cladding layer.

4. A method according to claim 1, further comprising the stop of arranging the optoelectronic device on top of the one or more alignment features so as to obtain vertical alignment of the output port of the optoelectronic device with the light in put end of the optical waveguide.

5. A method according to claim 1, wherein one or more second alignment features are arranged on the bottom of the optoelectronic device, and wherein the step of aligning the output port of the optoelectronic device with the light input end of optical waveguide further comprises the step of abutting said second alignment feature(s) to the first and second tapered side surface parts of the first alignment feature(s) so as to obtain horizontal alignment.

6. A method according to claim 1, wherein step e) comprises etching by reactive ion etching.

7. A method according to claim 1, further comprising soldering the optoelectronic device to one or more electrical contact pads formed beside the alignment features on exposed parts of the substrate.

8. A method according to claim 1, further comprising the steps of:

forming, on the substrate, a ridge at least partly encircling the optoelectronic device, providing a lid, and soldering said lid to said ridge for sealing the optoelectronic device and the input end of the waveguide.

* * * * *